April 20, 1965 G. C. MEYERS 3,179,742

AUTOMATIC MESSAGE IDENTIFICATION CIRCUIT FOR TELEGRAPH MACHINES

Filed May 1, 1962 5 Sheets-Sheet 1

INVENTOR
GORDON C. MEYERS

BY [signature]
ATTORNEY

AUTOMATIC MESSAGE IDENTIFICATION CIRCUIT FOR TELEGRAPH MACHINES

Filed May 1, 1962 5 Sheets-Sheet 2

INVENTOR
GORDON C. MEYERS
BY [signature]
ATTORNEY

INVENTOR
GORDON C. MEYERS
BY J J Hamill
ATTORNEY

AUTOMATIC MESSAGE IDENTIFICATION CIRCUIT FOR TELEGRAPH MACHINES

Filed May 1, 1962

INVENTOR
GORDON C. MEYERS

BY [signature]
ATTORNEY

April 20, 1965 G. C. MEYERS 3,179,742

AUTOMATIC MESSAGE IDENTIFICATION CIRCUIT FOR TELEGRAPH MACHINES

Filed May 1, 1962 5 Sheets-Sheet 5

INVENTOR
GORDON C. MEYERS

BY J.J. Hamill
ATTORNEY

United States Patent Office 3,179,742
Patented Apr. 20, 1965

3,179,742

AUTOMATIC MESSAGE IDENTIFICATION CIRCUIT FOR TELEGRAPH MACHINES

Gordon C. Meyers, Glenview, Ill., assignor to Teletype Corporation, Skokie, Ill., a corporation of Delaware
Filed May 1, 1962, Ser. No. 191,530
9 Claims. (Cl. 178—3)

This invention relates to telegraph equipment and more particularly to telegraph equipment for controlling sequential telegraphic transmission of telegraph signals from a plurality of signal generating devices including an automatic message numbering device.

In central offices for torn tape telegraph switching systems, messages addressed to stations on lines other than an originating station's line are received and recorded in perforated tapes. The messages are routed from the central office to the outlying station on another line by tearing the tape from the reperforator which received the message and manually inserting the tape in a transmitter distributor set associated with the line to which the message is addressed. To prevent the loss of a message, each message sent out by the transmitter distributor set is preceded by a serial identifying number to facilitate locating a message in the event that the message is not received in proper form at the outlying station.

Inasmuch as the manual routing of the torn tape messages to the transmitter distributor sets would be a more time consuming operation if an operator had to wait for completion of the transmission, from one torn tape, over a line before being able to dispose of another torn tape addressed to a station on the same line, tandem transmitter distributor sets are provided and have alternative access to the same line. Hence, one transmitter distributor set can be loaded with a tape while the other transmitter distributor set is transmitting its tape.

The present invention is directed to the provision of more simplified and less expensive equipment for controlling torn tape transmitter distributor sets and automatic message identifying devices in a manner such that identifying information is automatically inserted before the body of a message and the body of the message is automatically transmitted before the automatic transmission of end-of-message information.

Accordingly, an object of the invention is to provide a simplified and inexpensive format control means for automatically initiating transmission of a message and for providing auxiliary code combinations such as start-of-message, identifying, and end-of-message code combinations in proper sequential relationship to message code combinations.

Another object of the invention is to provide format control circuitry having a device which functions to arrange the message format by switching between a signal generator providing start-of-message code combinations, identifying code combinations and end-of-message code combinations and a signal generator providing message code combinations and a signal generator providing message code combinations without the use of switching relays.

Another object of the invention is to provide simplified control circuitry for switching between a message signal generating means and a device which provides the message format and message auxiliary code combinations without using the conventional array of control relays.

Another object of the invention is to provide simplified circuitry for switching between the identifying portion of the message, the body portion of the message, and the end portion of the message which circuitry comprises primarily of timing contacts, a tape-out sensing contact and a stepping switch.

Another object of the invention is to simplify the message format control circuitry for a pair of tandem tape reader transmitters by providing a single stepping switch and a single pair of relays acting as flip-flop devices to enable one reader while disabling the other reader.

In accordance with the preferred embodiment of the invention, the insertion of a perforated tape into a tape reader and the depressing of the start switch for that tape reader prepares a circuit to step a stepping switch to a position where the stepping switch energizes the distributor clutch magnet of a distributor. At this and several immediately following positions of the stepping switch, five of the levels of the stepping switch are wired to provide permutation code conditions for generating start-of-message and station identifying signals and these signals are directed to the distributor for transmission out over the line. The distributor closes a mechanical timing contact once in each distribution cycle and completes a circuit to step the stepping switch through the start-of-message and station identifying positions to a position where the five levels of the stepping switch interconnect a serial numbering device with the distributor for furnishing the serial number code combinations to the distributor for transmission over the line. Upon completion of the transmission of the serial number, the stepping switch is stepped by the closing of a distributor timing contact to a position where a tape reader starting circuit is completed through circuitry prepared by the tape-out and start switches of the tape reader loaded with a message tape.

The tape reader begins sensing the perforated tape containing the body portion of the message and transfers this information to its associated distributor for serial transmission. Upon the opening of the tape-out contact due to the message tape having been fed through tape reader and upon the concurrent closing of the mechanical timing contacts in both the associated distributor and tape reader, the stepping switch steps to its end-of-message position where the end-of-message codes encoded on five levels of the stepping switch go to the first-mentioned distributor for serialized transmission over the output line to the outlying station. The closing of the first-mentioned distributor mechanical timing contacts during transmission of the last code combination of the end-of-message signal steps the stepping switch to a position where the stepping switch homes itself and is enabled for the next message.

In the embodiment of the invention utilizing tandem tape readers having access alternately to the transmission line, the insertion of a tape in a first one of the tape readers and the closure of its start contact causes energization of a first relay associated with the first reader which relay disables a second relay thereby preventing untimely and concurrent operation of a second tape reader due to the insertion of a tape and closure of the starting contact in the second tape reader. In operation of tandem tape readers, the tape-out sensing contact of the first reader and the zeroing of the stepping switch to its home position breaks the circuit of the first control relay and causes energization of the second control relay thereby disabling operation of the first tape reader until the second tape reader has transmitted its message.

Other features and advantages of the invention will become apparent from the following detailed description when considered in conjunction with the drawings wherein FIG. 1 is a block diagram illustrating the relationship of the stepping switch and transmitter distributor sets with one another and with the line according to the preferred embodiment of the invention;

The invention will be described as being employed in a central telegraph office wherein messages are received from outlying stations by reperforators which perforate the message in a paper tape. An operator in the central office receiving station, as is usual in such systems, tears the tape from the reperforator and records the number and/or time the message was received on a logging card provided on the cabinet of the receiving reperforator. The operator, after noting the address to which the message is addressed, transfers the torn message tape to a transmitter distributor set connected to the outgoing line for the addressed station.

Figure 1:
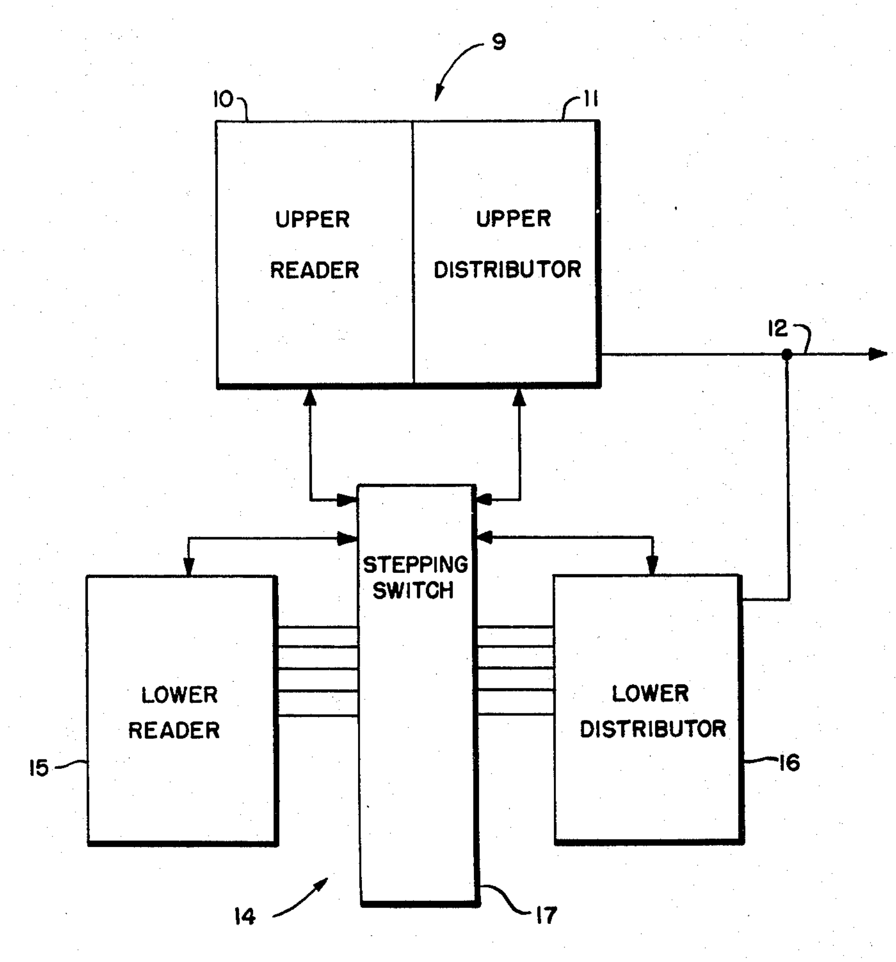
Figure 6:
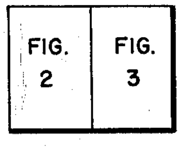
FIG. 6 is a block diagram showing the relationships of FIGS. 2 and 3 to one another.

Referring momentarily to the block diagram of FIG. 1, there is shown an upper transmitter distributor set 9 having an upper tape reader 10 for supplying parallel line output signals to an upper distributor 11 wherein the parallel signals are serialized and transmitted over an outgoing line 12. A lower transmitter distributor set 14 is comprised of a second reader 15 and lower distributor 16. The second reader 15 and second distributor 16 are interconnected by a stepping switch in a manner such that the parallel signals from the lower reader 15 are routed through five levels of the stepping switch 17 before they reach the lower distributor 16 for serialized transmission over the common outgoing line 12. As will be explained more fully hereinafter, the stepping switch 17 may also function as a signal generator and furnish signals over parallel leads to the lower distributor 16 for serial distribution over the outgoing line 12.

In normal operation, the stepping switch 17 furnishes the start-of-message code combinations, station identification code combinations, and serial number combinations to the lower distributor 16 for serialized distribution before transmission of a message, and then either enables the upper tape reader 10 to supply its message code combinations to the upper distributor 11 for transmission over the outgoing line 12 or enables the lower tape reader 15 to supply its message code combinations to the lower distributor 16 for transmission over the outgoing line 12. When the enabled tape reader finishes sending its message code combinations, the stepping switch 17 again functions as a signal generator and furnishes the lower distributor 16 with the end-of-message code combinations.

The transmiter distributor sets employed herein, and schematically illustrated in the drawings, are Model 28 transmitter distributor sets manufactured by Teletype Corporation and commonly referred to as LBXD's. The LBXD is a two-shaft transmitter distributor wherein one clutch and operating shaft is provided for operating the tape sensing pins of the tape reader and a second clutch and sequential cam shaft is provided for sequentially transmitting the information read by the tape reader as marking and spacing pulses. In this two-shaft transmitter distributor, a code combination is read by the tape sensing pins approximately one character cycle before it is distributed by the distributor and the reader shaft closes a mechanical timing contact during its reading cycle to operate a magnet controlling the clutch for the distributor shaft whereby the distributor shaft rotates in timed relation to the reader shaft. However, the distributor may be operated independently of the reader merely by energizing its distributor clutch magnet from an external source. For a more detailed explanation of a two-shaft transmitter distributor set, reference may be made to United States Patent No. 2,348,214, issued May 9, 1944, to Erwin A. Gubisch which discloses a two-shaft transmitter distributor similar in operation to the LBXD employed herein.

While the upper transmitter distributor set 9 is shown as a two-shaft transmitter distributor set having a separate upper reader 10 and a separate upper distributor 11, the upper transmitter distributor set 9 could equally as well be a single shaft transmitter distributor set since the upper distributor 11, in contrast to the lower distributor 16, is employed only for transmission of signals from the upper tape reader 10 and is controlled only by the upper tape reader 10.

Figure 4:
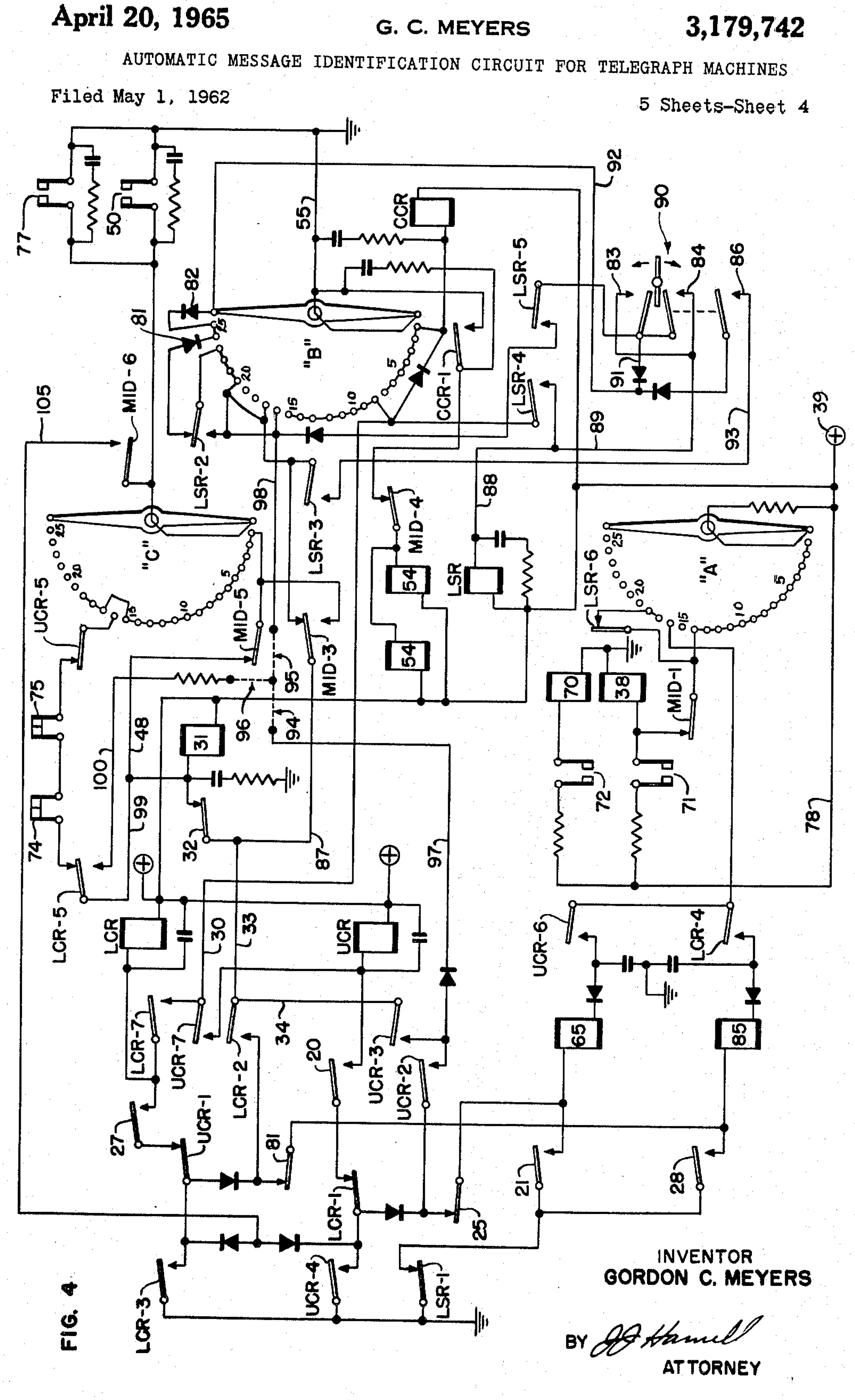
FIG. 4 is a schematic circuit diagram of control circuitry for the stepping switch, the tandem tape reader and the distributors according to the preferred embodiment of the invention.

Turning now to the control circuitry diagram of FIG. 4, it will be seen that with the insertion of a message tape in one of the tape readers, e.g. in the upper tape reader 10, tape transmitter distributor set 9 closes the upper tape reader's normally open tape-out contacts 20. After placing the tape in the upper tape reader 10, the operator moves the upper reader's on-off switch to a start position thereby closing a start contact 21 for the upper tape reader 10. Concurrent closing of the tape-out contact 20 and start contact 21 completes a circuit to energize an upper control relay UCR whose function is to enable operation of the upper tape reader 10 and to disable operation of the lower tape reader 15. The energizing circuit for the upper control relay UCR is from positive battery, coil of control relay UCR, normally open, now closed, upper reader tape-out contacts 20, normally closed contact LCR–1 of a lower control relay LCR, normally closed, stepping switch off-normal contacts 25, normally open, now closed, upper reader start contacts 21, and normally closed line seizure contacts LSR–1 to ground.

The upper control relay UCR in operating disables operation of a lower control relay LCR and lower tape reader 15 by opening its normally closed contacts UCR–1 which are in an initial energizing circuit for the lower control relay LCR. The initial energizing circuit for the lower tape reader 15 is prepared by lower reader tape-out contacts 27 and lower reader start contacts 28. Thus, even though the lower tape reader 15 is loaded with a tape and its bat handle is in position to close the lower reader start contacts 28, lower reader control relay LCR cannot energize as long as the upper control relay UCR is energized and maintains its normally closed contacts UCR–1 open.

Operation of the upper reader control UCR closes its normally open contacts UCR–2 and UCR–3 to complete an initial energizing circuit for a stepping switch magnet 31 to move the stepping switch wipers from a home position to the first position on the stepping switch 17, the circuit extending from positive battery, the coil of the stepping switch magnet 31, self-interrupting contact 32, lead 33, lead 34, normally open, now closed contact NCR–3, normally open, now closed contact UCR–2, normally closed, off-normal contacts 25, normally open, now closed upper reader start contacts 21, and normally closed line seizure contacts LSR–1 to ground.

The stepping switch 17 is a commercially available stepping switch of well known construction having 26 rotative positions and eight banks or levels. The stepping switch has a set of self-interrupting contacts 32 which are normally closed contacts, but which open each time the stepping switch magnet 31 is energized, thereby breaking those energizing circuits for the stepping switch magnet 31 passing through these self-interrupter contacts 32. The stepping switch 17 also has a pair of off-normal contacts 25 which are closed when the stepping switch 17 is in its home position, i.e. the zero or 26th position, and which are open whenever the stepping switch 17 is in any other position except its home position. A pawl operable by the stepping switch magnet 31 moves the wipers of the stepping switch forward one position each time the stepping switch magnet 31 is de-energized. Three levels of the stepping switch, levels A, B and C (FIG. 4) are used for control purposes and the wipers of the remaining five levels, namely, levels D, E, F, G and H (FIG. 2) are interconnected with the lower distributor 16 through five parallel leads 35a–35e, inclusive, and have their positions 16 interconnected with the reader 15 by five parallel leads 36a–36e, inclusive.

When the wiper of stepping switch 17 has moved to position No. 1 the normally closed, off-normal contacts 25 (FIG. 4) open and break the hereinbefore described energizing circuits for the upper control relay UCR and the stepping switch magnet 31. The upper reader control relay UCR is, however, held energized by a holding circuit extending from positive potential, coil of relay UCR, normally open, now closed, tape-out contacts 20, normally closed, contacts LCR–1 of the lower reader control relay LCR–1, normally open, now closed contacts UCR–4 of upper control relay UCR, to ground.

To assure circuit continuity and movement of the stepping switch through positions Nos. 1–15, inclusive, even though the operator removes the tape from the upper tape reader 10 before the message tape has been read by the tape reader 10, an alternative holding path for the upper control relay UCR is completed by a normally open, now closed, contact UCR–7, lead 30, positions Nos. 1–7 or positions Nos. 8–15 of level B of the stepping switch 17, wiper of level B and lead 55 to ground. Thus, the upper control relay UCR is held energized through positions Nos. 1–15 of the stepping switch even though the tape has been removed from the upper tape reader 10 thereby assuring that the stepping switch 17 cannot be locked in any of the positions Nos. 1–15 without any provision for removal from this position.

Also, at position No. 1 of level A of the stepping switch 17 (FIG. 4), the lower distributor 16 begins operation due to the energization of the lower distributor magnet 38. The circuit for energization of the lower distributor magnet 38 extends from a source 34 of positive potential, position No. 1 of level A of the stepping switch 17, normally closed MID switch contacts MID–1, coil of the lower distributor magnet 38 to ground. As hereinbefore described, the energization of a distributor magnet causes its associated distributor cam shaft to rotate and sequentially apply the furnished marking and spacing battery as marking and spacing signals over the outgoing line.

Even thought it is the upper tape reader 10 that is loaded with the message tape and that has its control relay UCR operated, it should be noted, that it is the lower distributor 16 rather than the upper distributor 11, that is energized to distribute the start of message and station identifying code combinations for the message which will be later distributed by the upper distributor 11.

Figure 2:
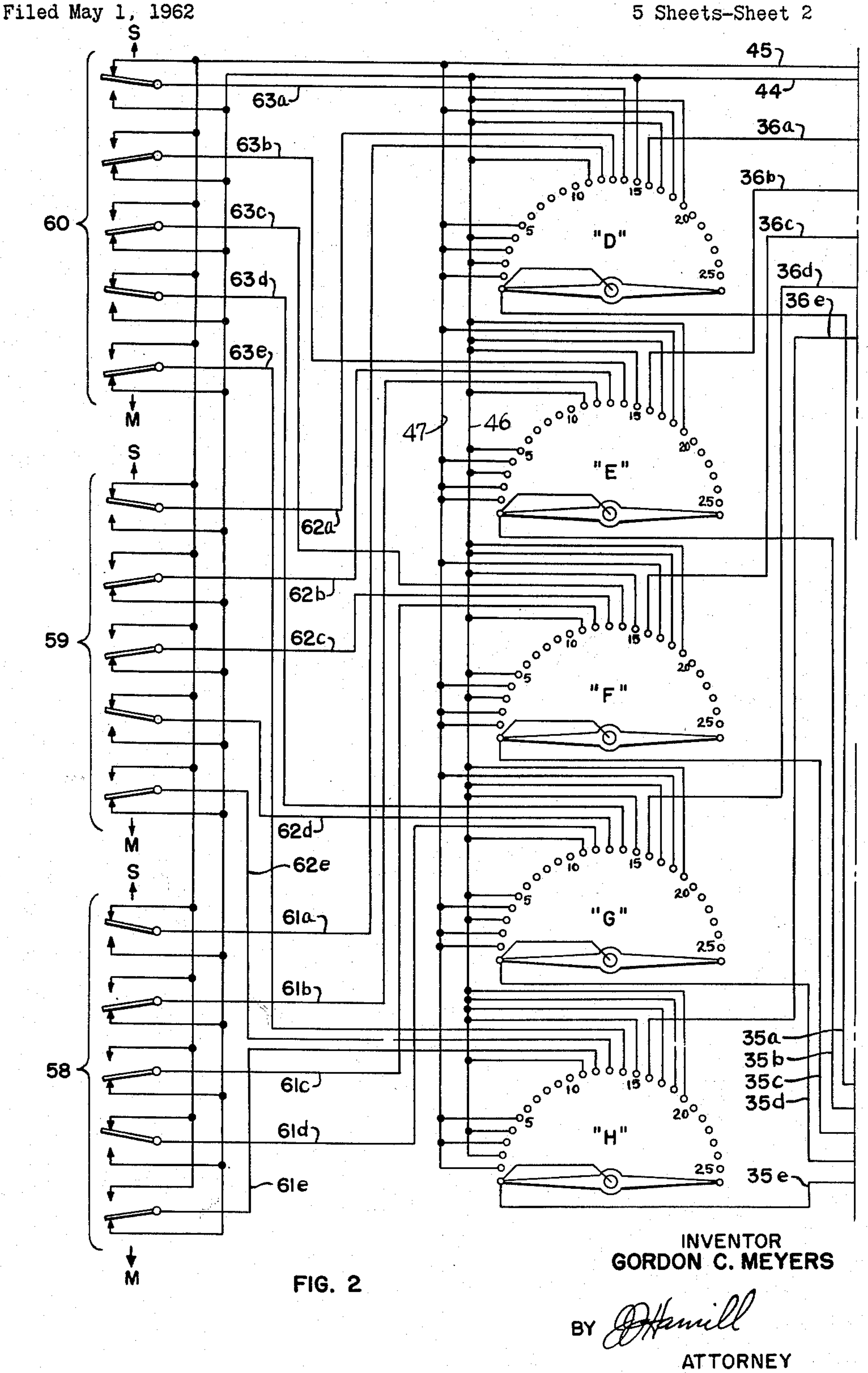
FIG. 2 is a schematic circuit diagram showing the manner in which five levels of the stepping switch are interconnected with contacts of the numbering device according to the invention.
Figure 3:
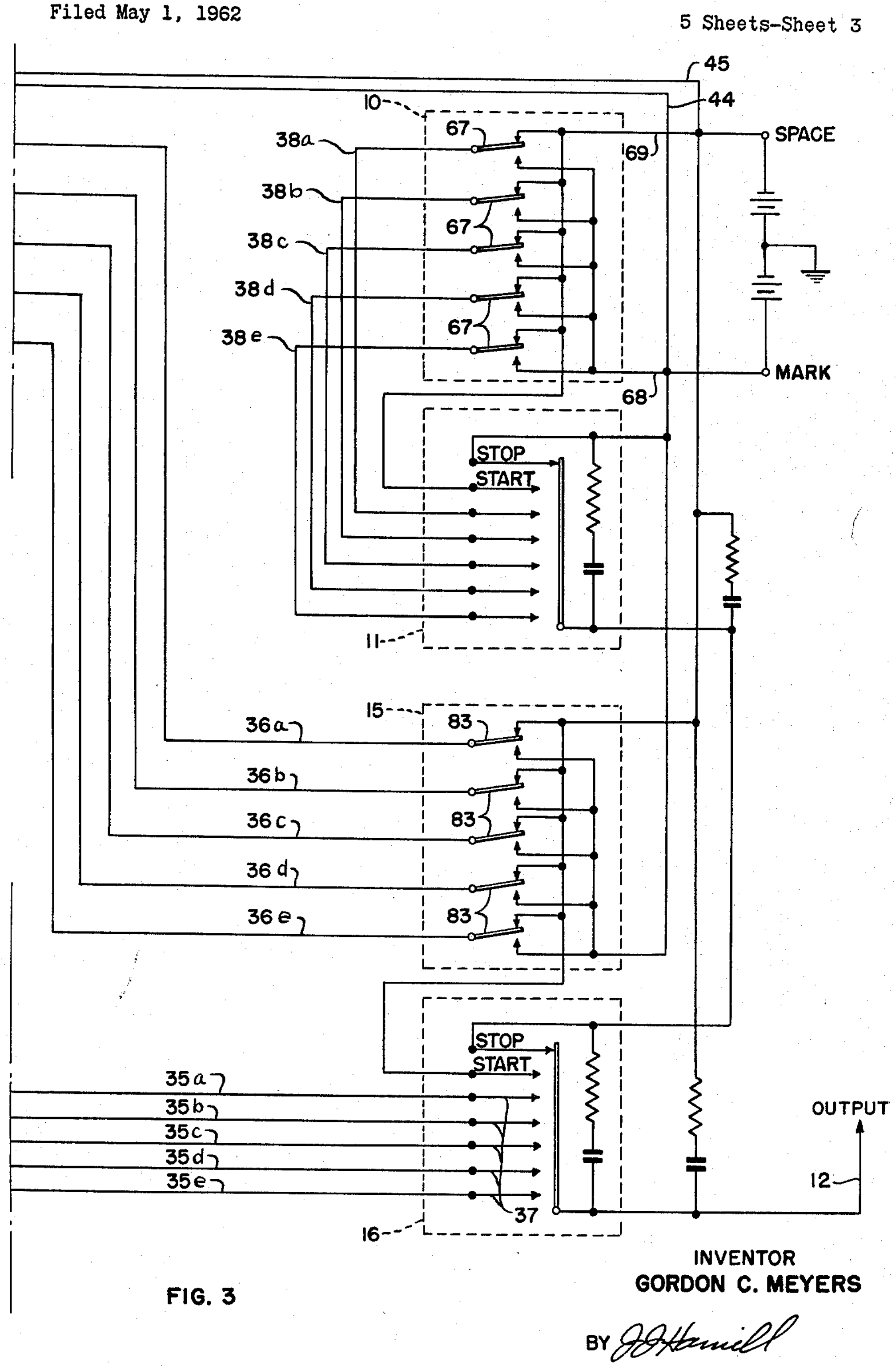
FIG. 3 is a schematic circuit diagram of the tandem tape readers and distributors according to the preferred embodiment of the invention.

Referring now to FIGS. 2 and 3, the stepping switch wipers of levels D–H, inclusive, of the stepping switch 17 are shown interconnected by leads 35a–35e, inclusive, with distributor contacts 37; and positions No. 16 of levels D–H, inclusive, of the stepping switch 17 are shown interconnected by leads 36a–36e to the lower reader 15. The upper tape reader 10 and upper distributor 11 have no such interconnections with levels D–H, inclusive, of the stepping switch 17 but are interconnected to one another over leads 38a–38e. In positions Nos. 1–10, levels D–H of the stepping switch 17 are preferably encoded with start-of-message and station identification codes. As shown in FIG. 2, stepping switch positions Nos. 1–5, inclusive, are encoded with the Baudot code combinations of Blank, Z, C, Z, C, which are the start-of-message codes and positions Nos. 6–10, inclusive, are not shown wired for any particular code combinations but are left blank to be encoded with a given station's identifying codes.

The stepping switch 17 is encoded by connecting each of the positions of each level to either a common marking conductor 46 or a common spacing conductor 47 which receive marking and spacing battery from conductors 44 and 45, respectively. By connecting one of the common conductors 46 and 47 to a given position in each level, marking and spacing battery may be made available at each position of each level. Inasmuch as the distributor contacts 37 sequentially furnish the line with signals in the order of 1, 2, 3, 4 and 5 and as leads 35a–35e interconnect the distributor contacts 37 with wipers in levels D to H, inclusive, in the order of levels D, E, F, G, and H, the marking and spacing potentials appearing in successive levels D to H for a given stepping switch position constitute an encoded Baudot code combination. For example, at the second step of the stepping switch 17 marking battery is supplied by conductor 46 to position No. 2 of level D, spacing battery is furnished by conductor 47 to position No. 2 of the levels E, F and G and marking battery is furnished by conductor 46 to position No. 2 of level H. The presence of marking potential in the first and last levels and three spacing potentials in the intermediate levels of a five level Baudot code constitutes the code combination for the character "Z." Accordingly, at position No. 2 of the stepping switch 17, the stepping switch wipers in the D to H levels, inclusive, would supply the leads 35a and 35e with marking battery and the leads 35b, 35c, and 35d with spacing battery. The lower distributor 16 upon being operated will serialize these five signals in the well known manner and transmit them over the outgoing line 12 to a receiving station.

The lower distributor 16 is shown diagrammatically in FIG. 3 with marking battery applied through the stop contact to the line 12 when the distributor is at rest. Upon operation of the distributor 16, the stop contacts open and the start contacts close to apply spacing battery over the line 12. The five distributor contacts 37 are then sequentially connected to the line to apply their marking or spacing battery to the line in timed sequence after which the stop contact again closes.

When the distributor shaft (not shown) of the lower distributor 16, rotates to transmit the first code combination "BLANK," a cam on the distributor shaft momentarily closes a mechanical timing contact 50 (FIG. 4), which contact completes an energization circuit for the stepping switch magnet 31 through level C and results in the stepping of the stepper switch from position No. 1 to position No. 2 whereat wipers in levels D–H supply the code combination encoded on levels D–H, inclusive, of the stepping switch 17 at position No. 2 to the distributor 11 for transmission. The energizing circuit for the stepping switch magnet 31 includes the source of positive potential, coil of the stepping switch magnet 31, lead 48, normally closed contact MID–5, stepping switch wiper in level C, normally open, now closed lower distributor mechanical timing contact 50 and ground.

While the stepping switch is at position No. 1 in level B, a circuit is completed to energize a counter control relay CCR that controls the energization of a pair of counter magnets 54 that step a mechanical counter one digit each time the counter magnets 54 are energized and released. The counter control relay CCR is operated over a path extending from the source of positive potential 39, coil of counter control relay CCR, position No. 1 of level B of the stepping switch 17, wiper of level B and lead 55 to ground. Since positions Nos. 1 to 7, inclusive, of level B of the stepping switch 17 are wired together, the above-described energizing circuit for the counter control relay CCR remains completed during the movement of the stepping switch through positions Nos. 1 to 7.

Operation of counter control relay CCR closes its normally open contacts CCR–1 and completes an energizing circuit for counter magnets 54 from positive potential source 39, the coils of the counter magnets 54, normally closed contacts MID–4, normally open, now closed, counter control relay contacts CCR–1, and lead 55 to ground. The counter is of a conventional, commercially available type having three code drums, one drum for each of the units, tens and hundreds orders. Each drum has visual indicia of the numbers 0–9 and each drum has five cam peaks and valleys arranged in permutative combinations for each of the numbers 0–9 for actuating their respective transfer contacts 58, 59 and 60 (FIG. 2) to supply to the stepping switch a code combination of marking and spacing current, from the leads 44 and 45, representative of the number being counted.

During energization of the counter feed magnets 54 in positions 1 to 7 of the stepping switch 17, the counter feed magnets 54 enable an armature feed pawl linkage (not shown) for stepping the units coding drum after de-energization of the counter feed magnets 54 due to the arrival of the stepping switch wiper in level B at position No. 8. After the units code drum counts through numerals 0–9, a spur gear tooth (not shown) on the units code drum rotates a spur gear assembly on the tens drum one numeral position. An identical feeding of the hundreds drum takes place after the tens drum counts through its 0–9 numeral positions. All drums also have the capability of being manually reset.

The mechanical counter furnishes the three digits of the serial number for the message when the stepping switch wipers of levels D–H, inclusive, are positioned in position Nos. 12, 13 and 14. At position No. 12, leads *61a* to *61e* (FIG. 2) connect the transfer contacts 58 associated with the hundreds counter to the 12th positions of levels D to H, respectively, of the stepping switch 17. Those of the transfer contacts 58 engaging a peak on the hundreds code drum are in contact with their spacing contacts S and those transfer contacts resting in a valley on the hundreds code drum are in contact with their marking contacts M. As shown, the transfer contacts 58 engage S, M, M, S, M contacts in that order. Marking potential (positive battery) is supplied to the M contacts of the transfer contacts 58, 59, and 60 by conductor 44 and spacing potential (negative battery) is supplied to the S contacts of transfer contacts 58, 59 and 60 by conductor 45. Transfer contacts 58 apply the marking and spacing potential to conductors *61a* to *61e* and hence to positions Nos. 12 of levels D to H of the stepping switch 17. From the wipers of the levels D to H the marking and spacing potentials go over leads *35a* to *35e* to the distributor contacts 37 (FIG. 3) for serial distribution over the outgoing line 12. Likewise, in position 13 similar circuits from the transfer contacts 59 of the tens counter extend over leads *62a* to *62e*, position Nos. 13 of levels D to H of the stepping switch 17, and leads *35a* to *35e* to the distributor 16. In position No. 14 of the stepping switch 17 transfer contacts 60 of the unit's counter supply marking and spacing potential over leads *63a* to *63e* to position No. 14 of the stepping switch 17 for transfer via leads *35a* to *35e* to the distributor 16.

During the distribution of the potentials representative of the units number code combination by the distributor 16, the distributor shaft closes its lower distributor mechanical timing contact 50 to energize the stepping switch magnet 31 to move the wipers of the stepping switch to their 15th positions, where the code combination for LETTERS is encoded on levels D to H, inclusive.

In the circuits described thus far, it should be noted that the release of the stepping switch magnet 31 is not effected by its interrupter contact 32 in the manner switches of this type usually operate but that the breaking of the circuit to the stepping switch magnet 31 is effected by the timing contact 50. Consequently, since the timing contact 50 is held closed until near the end of the cycle of the lower distributor shaft, the lower distributor clutch magnet 38 will be energized and start a cycle of this distributor by the time the wiper in level A of the stepping switch reaches the 15th position. The lower distributor shaft will therefore go through a cycle while the wipers are in the 15th position even though its energizing circuit is broken at level A. During the 15th cycle of rotation of the lower distributor shaft, it closes its lower distributor mechanical timing contact 50 again to complete the energizing circuit, traced above, for the stepping switch magnet 31 to move the stepping switch 17 to the 16th position, which is the message position. Since position No. 16 of level A is not connected to lower distributor magnet 38, the lower distributor 16 will not operate at position No. 16 of the stepping switch.

In the 16th position of the stepping switch 17 the wiper in level A prepares an energizing circuit for either an upper tape reader magnet 65 or the lower tape reader magnet 85. Because the upper control relay UCR is energized and has closed its normally open contact UCR–6 it is the upper tape reader magnet 65 that is energized at this time over a path from positive potential, position No. 16 of level A of the stepping switch 17, normally open, now closed, contact UCR–6, of the upper control relay UCR, coil of the upper reader magnet 65, normally open, now closed, upper reader start contact 21, and normally closed line seizure contact LSR–1 to ground. Release of the upper reader shaft (not shown) upon the energization of the upper reader magnet 65 and the consequent initiation of a cycle of operation of the reader causes the tape sensing pins to move into sensing relationship with the perforated tape and these tape sensing pins displace their respective swingers 67 of their transfer contacts (FIG. 3) according to the permutative arrangement of the perforations in the tape. Accordingly, the marking and spacing battery furnished by leads 68 and 69, respectively, to the swingers 67 of the upper tape reader 10 is routed according to the permutative positions of the swingers 67, over leads *38a*–*38e* to the upper distributor 11 for sequential distribution preceded by the normal start signal and succeeded by the normal stop signal.

The upper distributor 11 is operated during each tape sensing cycle by the upper tape reader 10 as the reader's mechanical timing contact 72 (FIG. 4) closes to complete an energizing circuit for distributor magnet 70 from positive potential source, lead 78, normally open, now closed upper reader mechanical timing contact 72, coil of the upper distributor magnet 70 to ground. The upper tape reader magnet 65 is held energized during the sensing of all the code combinations in the tape and causes cyclic operation of the distributor 11 to distribute the last character read by the upper tape reader 10 until the message tape is read and fed out of the reader 10 over the line 12. The stepping switch 17 remains in its 16th position until the message has been fed through the tape reader.

Upon completion of the transmission of the message stored in the tape in the upper tape reader 10, the message format is such that the end-of-message codes are next to be transmitted and this necessitates switching back to the stepping switch 17 which furnishes the end-of-message code combinations. The upper tape-out contacts 20 detect the lack of a message tape in the upper tape reader 10 and open to release upper control relay UCR whose contacts UCR–6 open and break the energizing circuit for the upper reader magnet 65 thereby stopping the reader 10 from further operation.

The release of upper control relay UCR also results in the completion of an energizing circuit for the stepping switch magnet 31 to move the stepping switch from the 16th position to the 17th position. This energizing circuit for the stepping switch magnet 31 is from positive potential 39, the coil of the stepping switch magnet 31, the upper contact of transfer contacts LCR–5 of the lower control relay LCR, normally closed, upper reader cam operated, timing contact 74, normally closed lower reader, cam operated, timing contact 75, normally closed contact UCR–5 of the upper reader control relay UCR, position No. 16 of level C of stepper switch 17 and the normally open, now closed, upper distributor mechanical timing contact 77 to ground. It should be explained that contacts 74 and 75 of the upper tape reader 10 and lower tape reader 15, respectively, are closed when their respective reader shafts are at rest and that the upper distributor mechanical timing contact 77 momentarily closes during each revolution of the distributor shaft and, that the distributor shafts cycle starts near the end of the reader shaft cycle. Thus, on the last revolution of the distributor shaft which revolution follows the last rotation of the reader shaft of the upper tape reader 10 both reader mechanical timing contacts 74 and 75 and distributor mechanical timing contact 77 are momentarily closed during the last rotation of the distributor shaft to complete the above circuit. As the distributor shaft comes to rest, distributor mechanical timing contact 77 opens this energizing circuit for the stepping switch magnet 31, which de-energizes, and causes the stepping switch to move to position No. 17.

From the above description it is believed to be apparent that the simplified circuitry of applicant's device permits a switching, without the use of switching relays, from the identifying portion of a message encoded on stepping switch levels and furnished by a mechanical counter to the body of the message furnished by an external signal generator and then back to the control of the stepping switch 17 for the encoded end-of-message code combinations on the stepping switch 17. It is by employment of the mechanical timing contacts on the distributor and reader for the dual functions of timing of the distribution of the code combinations in relation to the sensing thereof and of switching to and from a reader that permits the switching from a stepping switch 17 to a reader and then back to the stepping switch 17 using only two relays in a flip-flop arrangement and without the employment of switching and controlling relays. That is, these timing contacts perform double functions of timing and switching, which accordingly results in a less expensive and simplified format control device.

Referring to FIG. 2, it will be seen that, in the 17th, 18th and 19th positions of the stepping switch, the code combinations corresponding to "FIGS," "H," and "LTRS" are encoded on levels D–H, inclusive, these codes having been arbitrarily selected as the end-of-message code combinations. To begin distribution of these codes an energizing circuit for the distributor magnet 38 is completed at positions Nos. 17 and 18 from a positive potential source at 39, level A of a stepping switch 17, contacts LSR–6, normally closed contacts MID–1, and coil of the lower distributor magnet 38 to ground. Because the distributor clutch magnet 38 has been energized and its shaft rotates to close its mechanical timing contact 50, the above stepping switch circuit is completed to move the stepping switch through position No. 19 to position No. 20 even though position No. 19 in level A is an open position. During the 17th, 18th and 19th rotations of the distributor shaft (not shown), the lower distributor mechanical timing contact 50 closes and completes an energizing circuit for causing the stepping switch magnet 31 to step the stepping switch 17 through positions Nos. 17, 18, and 19. The circuit for energizing stepping switch magnet 31 to step it across these last-mentioned positions extends from positive potential 39, coil of the stepping switch magnet 31, lead 48, normally closed MID switch contacts MID–5, level C of the stepping switch 35, lower distributor mechanical timing contact 50, now closed to ground.

At the positions Nos. 20, 21, 22 and 23 a zeroing circuit for the stepping switch magnet 31 is completed from positive potential 39, coil of the stepping switch magnet 31, self-interrupting contacts 32, lead 87, upper contact of transfer contacts MID–3, positions Nos. 20, 21, 22 or 23 of level B, wiper of level B and lead 55 to ground. When the wiper in level B is at one of the positions Nos. 24 or 25 the above-described zeroing circuit will be maintained through normally closed contact LSR–2 of line seizure relay LSR which interconnects positions 23 and 24. The stepping switch magnet 31 de-energizes at each position upon the opening of normally closed self-interrupter contacts 32, and when the relay releases the self-interrupter contacts 32 again close and complete the aforementioned energizing path for stepping the stepping switch 17. The procedure continues until the stepping switch wiper in level B moves to the home or zero position whereat blocking diode 82 prevents completion of the energizing path for the stepping switch through the wiper in level B.

After having arrived at the home position, the stepping switch 17 now examines the tape readers 10 and 15 for the next message. If the lower tape reader 15 is loaded with a message tape, the stepping switch 17 again cycles to furnish the message format and the serial number for a message tape in the lower tape reader 15. More particularly, when the stepping switch 17 is at zero or home position No. 26, the off-normal contact 81 is closed and prepares an operating circuit for the lower control relay LCR for completion by the presence of tape in the lower reader 15 and the closure of the reader's normally open start switch 28. The circuit for lower control relay LCR extends from positive potential, coil of the lower control relay LCR, normally open, now closed lower reader tape-out contacts 27, normally closed contacts UCR–1 of the upper control relay UCR, normally closed, off normal contacts 81, normally open, now closed lower reader start contacts 28, and normally closed line seizure contacts LSR–1 to ground. Operation of the lower control relay LCR prepares an initial energizing circuit for stepping switch magnet 31 which is as follows: Positive potential 39, coil of the stepping switch relay 31, self-interrupting contacts 32, conductor 33, normally open, now closed, contacts LCR–2 of the lower control relay LCR, off-normal contacts 81, normally open now closed, lower reader start contacts 28, and normally closed contacts LSR–1 to ground. Operation of the stepping switch magnet 31 causes its self-interrupter contacts 32 to open and its pawl (not shown) to move the stepping switch wiper to position No. 1 whereupon the normally closed off-normal contacts 81 open and break these initial energizing circuits for the lower control relay LCR and for the stepping switch magnet 31. However, the lower control relay LCR is not released since a holding circuit retains the lower control relay LCR operated over a path from positive potential 39, the coil of lower control relay LCR, normally open, now closed, lower reader tape-out contacts 27, normally closed contacts UCR–1, normally open, now closed, contacts LCR–3 of the lower control relay LCR to ground.

To assure circuit continuity and movement of the stepping switch 17 through positions Nos. 1–15, inclusive, even though the operator removes the message tape from lower tape reader 15 before the stepping switch arrives at message position No. 16, an alternative locking path for the lower control relay LCR is provided through normally open, now closed, contact LCR–7, lead 30, positions Nos. 1–7 or positions Nos 8–15, of level B, wiper of level B and lead 55 to ground.

With the stepping switch in the first position, marking and spacing battery from the lower reader 15 (FIG. 3) are applied over conductors 44 and 45 to conductors 46 and 47 leading to levels D–H, inclusive, of the stepping switch 17.

Arrival of the wiper of the stepping switch 17 at position No. 1 in level A completes an energizing circuit for the lower distributor magnet 38 from the positive potential source 34, position No. 1 of level A, normally closed contact MID–1, coil of lower distributor magnet 38 to ground. The distributor 16 initiates the transmission of the code combination "BLANK" and subsequent closures of the lower distributor mechanical timing contacts 50 cause the stepper switch 17 to step through the remaining start-of-message and station identifying positions, viz. Nos. 2–11, and through the serial numbering positions, viz. Nos. 12, 13 and 14. Upon arrival of the wiper of the stepping switch in level A at position No. 15, the energizing circuit for the lower distributor magnet 38 is broken. However, because the 15th rotation of the distributor has already begun and because during this rotation the distributor mechanical timing contacts 50 closes, the stepping switch magnet 31 energizes once again and causes the stepping switch wipers to move to the 16th or message position as described in connection with the operation of the upper reader 10.

At position No. 16 the lower tape reader begins sensing its message tape and sets swingers 83 of its transfer contacts according to the permutative arrangement of perforations in the message tape. The permutative setting of swingers 83 determines the marking and spacing battery permutative arrangement being routed through leads 36a to 36e to position No. 16 on levels D–H of the stepping switch 17, which is then routed over leads 35a to 35e to the distributor 16 for serial transmission over the outgoing line 12. The energizing circuit for the lower tape reader magnet 85 is from positive potentiial 39, position No. 16 of level A, normally open, now closed, contact LCR–4 of the lower control relay LCR, coil of the lower reader magnet 85 normally open, now closed, lower reader starts contacts 28, and normally closed contact LSR–1 to ground. The lower distributor magnet 38 energizes over a path from positive potential source 39, lead 78, normally open, now closed, lower reader mechanical timing contacts 71, coil of the lower distributor magnet 38 to ground. The lower distributor magnet 38 is energized over this path each time the lower reader 15 senses a code combination in the message tape.

When the message has been read and the tape has been fed through the lower tape reader 15, the lower reader tape-out contacts 27 open and release the operating circuit for lower control relay LCR, which, upon release, opens its contacts LCR–4 in the operating circuit of the lower reader magnet 85. As the lower tape reader 15 comes to rest, the lower tape reader shaft closes the lower reader mechanical timing contact 75. Because the distributor's cycle follows that of the reader cycle, the lower distributor shaft closes its lower distributor mechanical timing contacts 50 and completes an energizing circuit for stepping switch magnet 31 to move the stepping switch to position No. 17, which energizing path is as follows: Positive potential 39, the coil of the stepping switch magnet 31, normally closed upper contact of transcers contacts LCR–5, closed upper reader mechanical timing contacts 74, closed, lower reader mechanical timing contacts 75, normally closed contacts UCR–5, position No. 16 of level C. lower distributor mehanical timing contact 50 and ground. As the lower distributor shaft comes to rest, its distributor mechanical timing contact 50 opens and de-energizes the stepping switch magnet 31 causing the stepping switch 17 to move to position No. 17.

The end-of-message signals "FIGS," "H" and "LTRS" are encoded on the 17th, and 18th and 19th positions of the levels D–H, inclusive, of the stepping switch for transmission by the distributor in the same manner as previously described for the message sent by the upper tape reader. Likewise, the zeroing circuit is the same as previously described, i.e., from positive potential 39, coil of the stepping switch magnet 31, self-interrupting contacts 32, lead 87, normally closed upper contact of transfer contacts MID–3, positions Nos. 20, 21, 22 or 23, 24, 25 of level B, wiper of level B and lead 55 to ground.

At home position No. 26, the stepping switch 17 is enabled for generating the next message format identification code combinations if there is a message tape either in the upper tape reader or the lower tape reader.

While the upper tape reader 10 has been associated with its own separate upper distributor 11, it will be apparent that the upper tape reader 10 could also be strapped to the message position, i.e., position No. 16, in levels D–H, inclusive. of the stepping switch and the upper reader mechanical timing contact 72 could be placed in another energizing circuit for lower distributor magnet 38 rather than in the present position in the energizing circuit for upper distributor magnet 70. Thus, to practice the invention, it is not necessary that the second tape reader or signal generator have its own distributor.

While the foregoing description related to the utilization of two transmitter distributor sets 9 and 14, the description is also applicable without change, for the most part, the utilization of a single transmitter distributor set and a single shaft tape reader. With a few simple strap connections in the control circuitry of FIG. 4, as will be brought out hereinafter, and with the connection of the parallel leads from the single shaft reader to the message position, position No. 16, on levels D, E, F, G, and H of the stepping switch 17, a single distributor can be utilized for transmitting the message signals generated both by its own reader and a single shaft reader. Of course, with the employment of a single distributor for two tape readers economy is achieved in the elimination of one distributor.

For example, if a single shaft reader is substituted for the upper transmitter distributor set 9, the operation and transmission by the lower distributor set 16 of the start-of-message station identification and serial numbering code combination would have been the same through positions Nos. 1–15 of the stepping switch. If the single shaft reader is loaded with the message for transmission when the stepping switch arrives at position 16, the stepping switch magnet 31 is energized through a circuit including positive potential 39, coil of the stepping switch magnet 31, normally closed self-interrupter contact 32, leads 33 and 34, single shaft reader's upper control relay contact UCR–3, lead 97, strap connections 94 and 95, lead 98, position No. 16 of level B, the wiper of level B and lead 55 to ground. If the lower tape reader had contained the message, a holding circuit is provided to retain the stepping switch magnet 31 energized during the entire time that the reader is energized so that the stepping switch will move to position No. 17 upon completion of the message and upon the de-energization of the stepping switch magnet 31 at the end of the message. This circuit includes coil of the stepping switch magnet 31, lead 99, make contact LCR–5, lead 100, strap connections 96 and 95, lead 98 and position No. 16 of level B to ground. Thus, when relays UCR or LCR de-energize upon the opening of their associated tape-out contacts 20 and 27, at the end of the transmission of the message tape, either contacts UCR–3 or LCR–5 open the above-traced stepping switch magnet holding circuits. As the stepping switch magnet 31 de-energizes, it causes the stepping switch 17 to move forward into the first of end-of-message positions, viz. position No. 17.

While in normal practice the message identification and serial numbering format provided by the stepping switch 31 is desired in order to identify messages and prevent their loss, occasions may arise when it is desired to disable the functioning of the message identifying and serial numbering format and for this situation there has been provided a MID switch having a plurality of MID contacts. Actuation of the MID switch to a delete position causes the normally open MID contacts to close and the normally closed MID contacts to open and retain these positions until the MID switch is returned from the delete position to the non-delete position. The deletion of the message identification signals is accomplished by preventing transmission of the identifying signals by the lower distributor 16 while allowing the stepping switch 17 to step through the message identification positions of the stepping switch, namely, positions Nos. 1–15. To assure that the operator return the MID switch to its non-delete position after one message has been transmitted and to prevent unwanted deletion of message identifying codes from succeeding messages due to the MID switch being inadvertently allowed to remain in the delete position, the swinger of transfer contact MID-3, upon operation of this switch, is moved to engage its front contact and thereby break the zeroing circuit for the stepping switch magnet 31 thus preventing the stepper switch from arriving at the home position and starting the transmission of the next message, if any, awaiting transmission.

More specifically, if the operator moves the MID switch to the delete position and inserts a message tape into one of the tape readers, e.g., the upper tape reader 10, the message tape depresses a tape-out sensing pin causing upper tape-out contacts 20 to close and upper control relay UCR to operate over a path extending from positive potential, coil of upper control relay UCR, normally open, now closed upper reader tape-out contacts 20, normally closed contacts LCR-1 of the lower control relay LCR, normally closed, off-normal contacts 25, normally open, now closed, upper reader start contacts 21, and normally closed line seizure contacts LSR-1 to ground. Operation of the upper control relay UCR completes an initial energizing path for the stepping switch magnet 31 from positive potential 39, coil of the stepping switch magnet 31, self-interrupter contact 32, lead 33, lead 34, normally open, now closed, contact UCR-3 and UCR-2 of control relay UCR, normally closed, off-normal contacts 25, normally open, now closed, upper reader start contacts 21, and normally closed line seizure contacts LSR-1 to ground.

When the stepping switch 17 arrives at position No. 1, a fifteen step driving circuit for the stepping switch magnet 31 is initiated over level C for driving the stepping switch 17 through the first fifteen positions. The energizing circuit for the stepping switch magnet 31, when the MID switch has been operated, is from positive potential 39, the coil of the stepping switch magnet 31, normally closed self-interrupter contacts 32, lead 87, lower contact of transfer contacts MID-3, the first to fifteenth steps of level C, wiper of the level C, normally open, now closed, contact MID-6, lead 105, normally open, now closed, contacts UCR-4 of the upper control relay UCR to ground. It is to be noted that the stepping circuit for the stepping switch 17 during a message identification deletion operation does not include the distributor contacts 50 and 77, and it is to be noted that the MID switch opened its contact MID-1 to prevent energization of the lower distributor magnet 38 during the travel of the wiper from position 1 to position 15 in level A.

At the 16th position or message position the upper reader magnet 65 energizes and the message is transmitted by the upper distributor 11 in the normal manner. The tape reader 10 begins reading the tape when the upper tape reader magnet 65 has been operated over a path including positive potential source 39, position No. 16 of level A, normally open, now closed, contacts UCR-6 of upper control relay UCR, normally open, now closed, upper start contacts 21, now closed, normally closed contacts LSR-1 and ground.

When the tape-out condition occurs in the upper reader 10, tape-out contacts 21 open and release upper control relay UCR which opens its contacts UCR-6 in the energizing circuit of the upper reader magnet 65, whereupon the upper reader 10 shuts down. As the upper reader shaft comes to rest, its mechanical timing contact 74 closes and prepares an energizing circuit for stepping switch magnet 31 that includes positive potential 39, coil of stepping magnet 31, break contact of transfer contacts LCR-5, normally closed upper and lower reader mechanical timing contacts 74 and 75, normally closed contact UCR-5 and position No. 16 of level C, wiper of level C, and upper distributor timing contact 77 and ground. As the distributor mechanical timing contact 77 closes it completes the above energizing circuit for the stepping switch to move it to position No. 17. Normally, in the end-of-message position Nos. 17 and 18, lower distributor magnet 38 is energized through level A and MID contact MID-1.

When the stepping switch is in positions 17, 18 and 19, the energizing circuit for stepping switch magnet 31 extends from positive potential, coil of stepping switch relay 31, lead 48, normally closed MID contact MID-5, positions 17, 18 or 19 in level C, wiper in level C, normally open, now closed, distributor contacts 50 to ground.

If the MID switch had not been returned to its non-delete position, the lower distributor magnet 38 would not have been energized due to MID contact MID-1 being open. Since the distributor camming contact 50 would also be open, the energizing circuit for stepping switch magnet 31 would be broken through level C.

Also, if the MID switch has not been returned to its non-delete position the zeroing circuit for the stepping switch magnet through level B is open since the swinger of the MID contacts MID-3 is engaging its lower contact rather than the upper contact leading to positions 20, 21, 22 and 23 of level B. However, return of the MID switch to the non-delete position completes the end of message and zeroing paths for stepping switch magnet. The zeroing path is through level B, the circuit including positive potential source 39, coil of stepping switch magnet 31, self-interrupter contacts 32, lead 87, the upper contact of the transfer contacts MID-3, positions 20, 21, 22 or position 23 and normally closed line seizure contacts LSR-2 in level B wiper of level B, and lead 55 and ground.

To provide for greater flexibility in the employment of the numbering and identification capabilities of the present invention, provision has been made for remote seizure and utilization of the number and identification capabilities with signal generating devices other than the upper and lower tape readers 10 and 15. For example, if a keyboard teleprinter were associated with the upper and lower tape readers at the central station, the operator could operate a line seizure switch and seize the line and utilize the identification and numbering device preparatory to keyboarding a message over the line. Also, an operator at an outlying station might wish to seize the line and utilize the identification and numbering module to identify a message originating at the outlying station as though it originated at the central station. Provision is also made for line seizure, without identification and numbering. To these ends, a manually operable three position seizure switch 90 has a middle inoperative position, an upper line seizure with numbering position, and a lower line seizure with no numbering position.

The seizing of the line by the operator at a remote station does not occur immediately upon the throwing of the line seizure switch 90 as it is desired not to interrupt the processing of a message then being transmitted. Line seizure occurs after completion of the message presently being transmitted and before the transmission of the next succeeding message tape by the other tandem tape reader, assuming, of course, that the other reader is loaded with a message tape. More specifically, if a message tape is in the process of being transmitted e.g., by the upper tape reader 10, and the stepper switch 17 is in message position No. 16, the throwing of the switch 90 by the operator at a remote location to its upper position (numbering) prepares an operating circuit for a line seizure relay LSR for completion when the message and end-of-message sequence have been transmitted and the stepper switch 35 reaches position No. 24. The line seizure relay LSR has an energizing circuit from positive potential source 39, coil of the seizure relay LSR, leads 88 and 89 normally open, now closed, middle contact 84 of switch 90, leads 91 and 92, position No. 26 of level B, position No. 25 of level B, position No. 24, wiper of level B, and lead 55 to ground. Thus, after the upper tape reader 10 has completed its transmission of the desired message and the stepping switch has moved through the end-of-message sequence and is in position No. 24 of zeroing sequence, the line seizure relay LSR operates and opens its line seizure contacts LSR–1 to disable operation of either the upper control relay UCR or the lower control relay LCR when the stepping switch arrives in the home position No. 26. That is, even though the lower tape reader 15 is loaded with a tape for transmission, its control relay LCR cannot be energized when the stepping switch 17 reaches the home position No. 26 since the line seizure relay LSR was energized before the stepping switch 17 reached home position and had opened its normally closed line seizure contacts LSR–1 which are in the initial energizing circuits for both the upper and lower control relays UCR and LCR. After the stepping switch 17 reaches the home position No. 26, an initial energizing circuit for the stepping switch magnet 31 extends from positive potential 39, coil of the stepping switch magnet 31, self-interrupting contacts 32, lead 87, break contact of transfer contacts MID–3, normally open, now closed, line seizure contact LSR–3, normally open, now closed, lower contact 86 of the remote control switch 90, lead 92, position No. 26 of level B, wiper of level B, and lead 55 to ground. In positions Nos. 1–15, the distributor clutch magnet 38 is energized over level A and the stepping switch magnet 31 is energized over level C and hence stepping switch 17 moves through its normal message identification operations to the 15th position by operation of circuits previously traced.

To assure circuit continuity through the identification sequence, the upper and lower control magnets UCR and LCR are maintained disabled by the line seizure contacts LSR–1 and the line seizure relay LSR is held locked up over these first fifteen positions over a circuit including positive potential source 39, coil of line seizure relay LSR, lead 88 normally open, now closed, contacts LSR–4, positions Nos. 1–7 or positions Nos. 8–15 of the level B, wiper of level B and lead 55 to ground. In position 16 of level B, relay LSR is held operated over a path extending from positive potential source 39, coil of magnet LSR, leads 88 and 89, closed contact 84, closed contact LSR–5, position No. 16 of level B, wiper of level B and lead 55 to ground.

While the wipers of the stepping switch 17 are at position No. 16, an energizing circuit for the stepping switch magnet 31 is completed over position No. 16 of level B over a path extending from positive potential source 39, coil of stepping switch magnet 31, interrupter contact 32, lead 87, break contact MID–3, positions Nos. 22 and 23 of level B, make contact LSR–2, position No. 16 of level B, wiper of level B, and lead 55 to ground. The stepping switch 17 moves to position No. 17 and stops. The operator may now keyboard in a message or generate a message by other signal generators. The end of message sequence is not transmitted when the stepping switch 17 is in position No. 17 since the energizing circuit for lower distributor magnet 38 through position No. 17 in level A is broken by break contact LSR–6. After the message has been transmitted, the operator must return line seizure switch 90 to its middle position which operation opens its contact 84 in the operating circuit of relay LSR. Upon deenergization relay LSR, break contact LSR–6 closes and completes the energizing path for the lower distributor magnet 38 through positions 17 and 18 of level A. The end-of-message signals are then transmitted and the lower distributor contact 50 completes the energizing circuit for stepping magnet through level C to move stepping switch to position No. 20.

At position No. 20, the stepping switch 17 begins to zero as stepping switch magnet 31 energizes over a path extending from positive potential source 39, coil of stepping switch magnet 31, interrupter contact 32, break contact of transfer contacts MID–3, positions Nos. 20, 21, 22 or 23 of level B, wiper of level B and lead 55 to ground. Of course, in positions Nos. 24 and 25 of level B normally closed, line seizure switch contacts LSR–2, are included in the above zeroing circuit. The afore-mentioned zeroing circuit causes the stepping switch to move through position No. 25 to the home position No. 26.

Because line seizure contacts LSR–1 closed with the release of line seizure relay LSR, one of the control relays UCR or LCR is enabled for operation if any messages are available for transmission in either the upper or lower readers 10 and 15 when the stepping switch arrives at the home position.

If the stepping switch 17 is at the home position when the line seizure switch 90 is pivoted clockwise to its No Number position, the stepping switch 17 is immediately disabled, whereas, if the stepping switch 17 is not at the home position, the stepping switch is not disabled until it completes its format control operations.

Taking first, the example of the stepping switch at the home position, when the line seizure switch 90 is pivoted to its clockwise, No Number, position it will be seen that the upper contacts of line seizure switch 90 close to complete an energization path for line seizure relay LSR from positive potential source 39, coil of relay LSR, leads 88 and 89, the normally open, now closed, upper contact 83 of line seizure switch 90, leads 91 and 92, position No. 26 of relay B, wiper of level B and lead 55 to ground. Line seizure relay LSR opens its contacts LSR–1 in the initial energizing circuits for the upper control relay UCR, the lower control relay LCR, and the stepping switch magnet 31. Thus, the format control and automatic identification capabilities of the stepping switch 17 have been disabled and the operator is free to use the line 12 with some remote signal generating source such as a keyboard. When the operator returns the line seizure switch 90 to its middle position, its upper contact 83 opens and breaks the energizing circuit for line seizure relay LSR, which releases and allows its line seizure contacts LSR–1 to assume their normally closed position in the initial energizing circuits for upper control relay UCR, lower control relay LCR, and stepping switch magnet 31. Thus, the control of the signal generating devices is returned to the stepping switch 17 for future operations.

If the stepping switch had been in a position wherein it is controlling the message format, e.g., message position, position No. 16, when the line seizure switch 90 was pivoted clockwise to its No Number position, the energizing circuit for the line seizure relay LSR would be prepared by the upper contact 83 of the switch 90 but would remain open at level B since blocking diode 81 in level B prevents the completion of the energizing circuit for line seizure relay LSR through level B until the wiper in level B moves from position No. 16 to position No. 24. Thus, after the message and end-of-message signals are transmitted and the stepping switch wiper in level B has reached position No. 24, the energizing circuit for line seizure relay LSR is completed from positive potential 39, coil of relay LSR, leads 88 and 89, normally open, now closed upper contact 83 of line seizure switch 90, leads 91 and 92, position No. 26 of level B, position No. 25 of level B, position No. 24 of level B, wiper of level B and lead 55 to ground. Upon energization, relay LSR opens its normally closed contacts LSR–1 to prevent completion of the initial energizing circuits for upper control relay UCR, lower control relay LCR and stepping switch magnet 31, thereby disabling the format control capabilities of the stepping switch 17. The operator may now use the line 12 in conjunction with other signal generating devices, such as a keyboard, without interference from the stepping switch 17.

To resume normal operation of stepping switch 17 and thereby format control, the operator must return line seizure switch 90 to its middle position whereupon its upper contact 83 opens the energizing circuit for line seizure relay LSR. Return of the swinger of line seizure transfer contacts LSR–2 to its upper contact completes the usual zeroing circuit for the stepping switch magnet 31 through level B. When the stepping switch arrives at the home position, line seizure contacts LSR–1 have returned to their normally closed condition and have prepared for completion the initial energizing circuits for the upper control relay UCR, lower control relay LCR and stepping switch magnet 31. At the home position, the line seizure contacts LSR–1 are closed and normal operation may ensue.

While the simplified identification and serial numbering device and circuitry therefor have been described as being employed with a pair of tandem transmitter distributor sets having alternative access to a signal line, the identification and serial numbering circuitry is capable of use with a single transmitter distributor set as shown in the embodiment in FIG. 5, as will be described hereinafter. The upper control relay UCR and the lower control relay LCR have been deleted from the embodiment in FIG. 5, but otherwise, the circuitry closely parallels that shown and described hereinbefore. Inasmuch as the control relays are not needed to disable and enable alternative readers, the simplicity of the identification and numbering circuitry due to the elimination of relays for alternating between an identification and end-of-message signal generating means and a message signal generating means should become more apparent after considering this embodiment.

Figure 5:
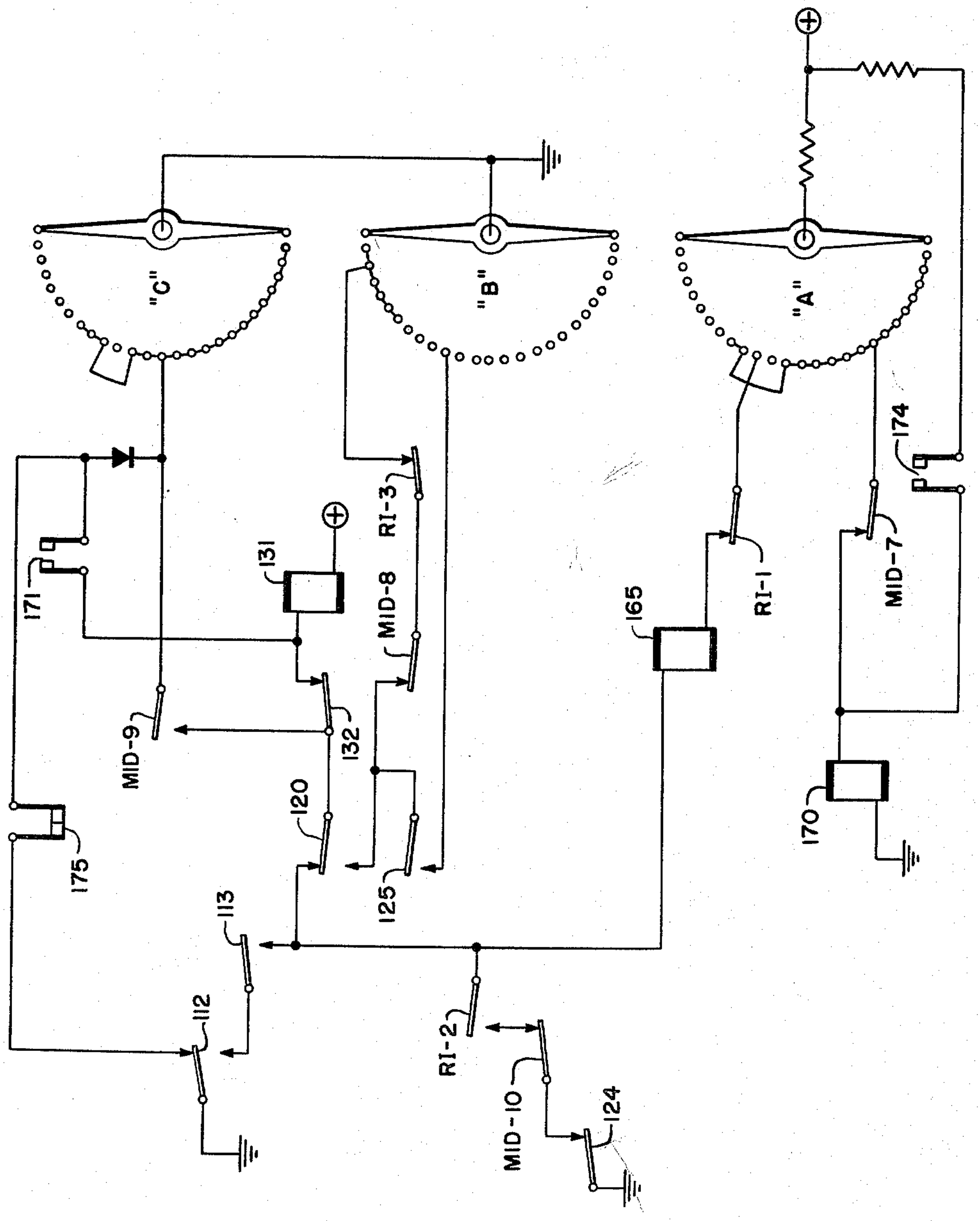
FIG. 5 is a schematic circuit diagram of control circuitry for the single channel reader, distributor and stepping switch according to another embodiment of the invention.

In the embodiment of the invention illustrated in FIG. 5 a tape-out transfer contact 112 and a start switch 113 serve to control the operation of a reader magnet 165, a stepping switch actuating magnet 131 and distributor magnet 170. With the stepping switch magnet 131 (FIG. 5) deenergized and reader magnet 165 deenergized and the stepping switch in its home or zero position, the placing of a message tape in the tape reader moves the swinger from its upper contact to its lower contact of tape-out transfer contacts 112. A subsequent closure of a start switch contact 113 completes an initial energizing circuit for the stepping magnet 131 through a path from positive potential, coil of the stepping switch magnet 131, self-interrupting contacts 132, normally closed, off-normal contacts 120, normally open, now closed start contacts 113, lower contact of the tape-out contacts 112 to ground. When the stepping switch magnet 131 operates, it opens its normally closed, interrupter contacts 132 thereby deenergizing the stepping switch magnet 131 to move the stepping switch wipers to position No. 1. Movement of the stepping switch from the home position, opens normally closed contacts of the off-normal contacts 120 and breaks the above-traced initial energizing circuit for the stepping switch magnet 131.

As in the case of the tandem signal generators previously discussed, stepping switch levels D–H (not shown) are encoded from positions Nos. 1–15, inclusive, with start-of-message and station identifying code combinations and in positions Nos. 17, 18 and 19 with the end-of-message code combinations. Accordingly, at each position of the stepping switch, levels D–H are connected to the distributor by the wipers in these levels of the stepping switch 17. In position No. 1 the wiper in level A (FIG. 5) of the stepping switch causes the distributor magnet 170 to be energized and distribute the first encoded signal combination on the stepping switch levels D–H, viz. "BLNK." The energizing circuit for the distributor magnet 170 is from positive potential, wiper of the stepping switch in level A, position No. 1 of level A, normally closed contact MID–7 and the coil of the distributor magnet 170 to ground.

As with the tandem signal generators, the rotation of the distributor shaft (not shown) sequentially distributes the characters encoded upon the stepping switch levels D–H and, during each rotation of the distributor cam shaft, the cam shaft closes a distributor mechanical timing contact 171 to energize the stepping switch magnet 131 to step the stepping switch from position to position during the first fifteen positions of the stepping switch. This energizing circuit for the stepping switch magnet 131 extends from positive potential, coil of the stepping switch magnet 131, normally open, now closed, distributor mechanical timing contacts 171, positions Nos. 1–15 of level C, and wiper of level C to ground. As the distributor mechanical timing contact 171 opens during the transmission of each of the code combinations, it breaks the energizing path for the stepping switch magnet 131 whereupon the stepping switch moves to the next position.

The station identification code combinations and the numerical identification code combinations are sequentially transmitted until the stepping switch arrives at position No. 16. The wiper in level A (FIG. 5) breaks the energizing circuit for the distributor magnet 170, late in the distributor cycle at the 15th position letting the distributor continue rotation during the 15th step. During the 15th rotation of the distributor, the closure of the distributor mechanical contact 171 causes energization of the stepping switch magnet 131 via the wiper in level C over the energizing path previously traced to step the stepper switch to position No. 16.

At the message position, position No. 16, the reader magnet 165 energizes and its reader shaft (not shown) causes the sensing of the message tape. The energizing circuit for the reader magnet 165 at the 16th position is from positive potential, the wiper of level A, position No. 16 of level A, remote identification contacts RI–1, coil of the reader magnet 165, normally open, now closed, start contacts 113, lower contact of the tape-out transfer contacts 112 to ground. To distribute the code combinations sensed by tape sensing pins in the tape reader, reader timing contacts 174 close to energize the distributor magnet 170 over a circuit extending from positive potential, normally open, now closed timing contact 174, coil of the distributor magnet 170 to ground.

Upon completion of the sensing of the message tape by the tape reader and the feeding of the tape therethrough, the swinger of the tape-out transfer contacts 112 moves to engage its upper contact thereby breaking the energizing path for the reader magnet 165 and stopping operation of the tape reader.

To switch from the message transmission to transmission of the end-of-message codes encoded in positions Nos. 17, 18 and 19 of levels D–H, inclusive, there must be concurrent closings of the reader mechanical timing contacts 175 and distributor mechanical timing contact 171. The mechanical timing contact 175 is closed when the reader shaft is in rest position and the distributor mechanical timing contact 171 momentarily closes during the last rotation of the distributor shaft which rotation follows the reading of the last code combination in the tape. Accordingly, an energizing circuit for the stepping switch magnet 131 is completed from positive potential, coil of the stepping switch magnet 131, normally open, now closed, distributor mechanical timing contacts 171, normally closed reader mechanical timing contacts 175, upper contact of the tape-out transfer contacts 112 to ground. Thus, it is apparent that it takes this unique positioning of the tape-out contacts 112 and the mechanical timing contacts 175 and 171 on the reader and distributor, respectively, to cause a switching operation from the tape reader to the stepping switch without the provision of any switching relays.

After opening of the distributor mechanical timing contact 171 as the distributor shaft comes to rest, a circuit is completed for distributing the end-of-message code combinations, viz. "FIGS," "H" and "LTRS," stored on the levels D–H in positions Nos. 17, 18, and 19 of the stepping switch. The distributor magnet 170 is energized for distribution of these end-of-message code combinations over a circuit extending from positive potential, a wiper of level A, positions Nos. 17 and 18 of level A, wiper of level A, normally closed contact MID–7 and coil of distributor magnet 70 to ground. The distributor magnet 170 is energized during the 19th step as the stepping switch moves late in the cycle. Closure of distributor mechanical timing contact 171 during positions Nos. 17, 18 and 19 causes the stepping switching magnet 131 to energize over a path from positive potential, coil of relay 131, normally open, now closed, distributor contacts 171, positions Nos. 17, 18 and 19 of level C and wiper of level C to ground.

Since the distributor magnet 170 continues to be energized through level A to position No. 18, the distributor mechanical timing contact 171 continues to close once each cycle and energize the stepping switch magnet 131 repeatedly until the stepping switch reaches position No. 20. To reach position No. 26, a zeroing circuit is established through positions Nos. 20 to 25 in level B, the zeroing circuit including positive potential source, coil of relay 131, normally closed self-interrupter contacts 132, lower contact of off-normal transfer contacts 132, lower contact of off-normal transfer contacts 120, normally closed contact MID–8, normally closed contact RI–3 and wiper of level B to ground.

When the stepping switch arrives at the home position the off-normal contacts 120 close and prepare the initial energizing circuit for the stepping switch magnet 131 for completion upon the presence of a tape in the tape reader and the closure of the start switch. If the tape has already been placed in the reader and the start switch closed, the stepping switch, upon arriving home, would immediately start the identifying sequence for this next message.

A message identification switch MID is provided to enable an operator to delete the identification format and allow the operator to use the tape reader to transmit a message without the prearranged signals being appended thereto. Upon actuation, the MID switch opens normally closed contact MID–7 to break the energizing circuit for the distributor magnet 170 to prevent the energization of the distributor magnet 170 and the distribution of the encoded signals on positions Nos. 1–15 during movement of the stepping switch from home position to the 16th position. The initial energizing circuit for the stepping switch magnet 131 for moving the stepping switch from its home position to the first position includes positive potential, coil of the stepping switch magnet 131, self-interrupter contacts 132, upper contact of the off-normal transfer contacts 120, normally open, now closed, start contacts 113, front contact of the tape-out transfer contacts 112, and ground. The energizing circuit for the stepping switch magnet 131 for the first to the 16th positions is from positive battery, coil of the stepping switch magnet 131, normally closed, self-interrupting contacts 132, normally open, now closed, contacts MID–9, the first through the fifteenth steps of level C of the stepping switch, the wiper of level C to ground.

Upon arrival at the 16th position or message position, the tape reader begins sensing the message tape as the tape reader magnet 165 becomes energized over an energizing circuit extending from positive potential, wiper of level A, 16th position of level A, normally closed, remote identification contact RI–1, coil of tape reader magnet 165, normally open, now closed, start contact 113, and lower contact of the tape-out transfer contacts 112 to ground. Operation of tape reader causes its reader shaft (not shown) to rotate and close its mechanical timing contact 174 to operate the distributor magnet 170 to distribute sequentially the message signal pulses over the line, the distributor magnet 170 being energized over an obvious circuit. When the message terminating with end-of-message signals has been read and the tape has been fed out of the reader, the swinger of the tape-out transfer contacts 112 moves from its front contact to its back contact, thereby preparing an energizing circuit for the stepping switch magnet 131, which circuit is completed upon concurrent closure of the reader mechanical timing contact 175 and the distributor timing contact 171. An energizing circuit for the stepping switch magnet 131 for moving the stepping switch through positions Nos. 17–19, inclusive, extends from positive potential, coil of stepping switch magnet 131, normally closed self-interrupter contacts 132, normally open, now closed contacts MID–9 positions Nos. 17–19 of level B, wiper of level B to ground. It is to be noted that end-of-message signals are generated by the stepping switch in these positions, but these signals are not transmitted due to the fact that contacts MID–7 are open, preventing operation of the distributor magnet 170. However, when the system is being operated in this mode, the end-of-message signals are contained in the tape being transmitted; so that this result is desired.

If the delete switch MID then is not returned to the non-delete position, the zeroing to home circuit for the stepping switch magnet 131 is broken by normally closed, now open, contact MID–8. No operations may occur until the MID switch is returned to its non-delete position and has closed contacts MID–8 to complete the zeroing circuit for the stepping switch including positive potential, coil of stepping switch magnet 131, normally closed self-interrupter contacts 132, the lower contact of off-normal transfer contacts 120, normally closed contacts MID–8, normally closed identification contacts RI–3, positions Nos. 20–25, inclusive, of level B, and wiper of level B to ground. Accordingly, an inadvertent deletion of a message number from a subsequent message or messages due to a previous operation of the delete switch to its delete position is prevented.

To provide more flexibility in the use of the identification and numbering signal generator with signal generators other than the tape reader, a remote switch has been provided, which upon operation, allows an operator to use the identification positions Nos. 1–15 and 17–19 in conjunction with a remotely generated message, i.e., one keyboarded by an operator or from a signal source other than the tape reader.

Upon operation of the remote switch, the tape reader magnet 165 is disabled by the opening of normally closed remote identification contact RI–1 in the energizing path of tape reader magnet 165, and a remote identification switch contact RI–2 is closed to complete an initial energizing circuit for the stepping switch magnet 31, from positive potential, coil of stepping switch magnet 131, normally closed, self-interrupter contacts 132, break contact of off-normal transfer contacts 120, normally open, now closed, contacts RI–2, normally closed contacts MID–10 and normally closed, off-normal contacts 124 to ground. As the stepping switch steps to position No. 1, normally closed, off-normal contacts 124 open to prevent a second energization of the stepping switch magnet 131 over this initial circiut and to disable this initial energizing circuit until the stepping switch again arrives at its home position.

The wiper in level A completes an obvious energizing path for the distributing magnet 170 and the code combination "BLNK" encoded on levels D–H of the stepping switch is distributed out over the line to distant stations.

Each time the distributor shaft rotates during its first fourteen cycles, it closes distributor mechanical timing contact 171 and completes an energizing circuit for the stepping switch magnet 131 extending from positive potential, coil of stepping switch magnet 131, normally open, now closed, distributor mechanical timing contacts 171, wiper of level C to ground. Accordingly, the stepping switch magnet 131 is repetitively energized during positions Nos. 1–14 inclusive, and the encoded signals on levels D–H of the stepping switch are transmitted in sequential order.

As the distributor distributes the 14th code combination and closes its mechanical timing contact 171 late in the cycle, the stepping switch magnet 131 has already deenergized and moved the stepping switch to position No. 15. Hence, closing of the distributor contact 171 completes the energizing circuit for the stepping switch magnet 131 and causes the stepping switch to move to the 16th position. At position No. 16 in level C, the distributor magnet's energizing circuit is broken and the stepping switch remains in this position while the operator initiates transmission of the message from the remote location.

After transmission of the message, the operator must depress a reset switch to close a reset switch contact 125 in an energizing circuit for the stepping switch magnet 131 before the stepping switch may move to the first of the end-of-message positions, viz., position No. 17. This energigzing circuit for the stepping switch magnet 131 extends from positive potential, coil of stepping switch magnet 131, normally closed, self-interrupter contacts 132, the make contact of the off-normal transfer contacts 120, normally open, now closed reset switch contact 125, position No. 16 of level B, and wiper of level B to ground.

In positions Nos. 17 and 18, the wiper in level A completes an obvious circuit for the distributor magnet 170 thereby causing the distribution of the end-of-message signals. Stepping switch magnet 131 is energized successively during positions Nos. 17, 18 and 19 over a path including positive potential, coil of stepping switch magnet 131, normally open, now closed distributor contacts 171, positions Nos. 17, 18 and 19 of level C, and wiper of level C to ground.

If the remote identification switch RI has been returned to its nonactive position by the operator, contact RI–3 completes a zeroing circuit through level B at positions Nos. 20 and 25, this circuit for stepping switch magnet 131 being from positive potential source, coil of stepping switch magnet 131, normally closed self-interrupter contacts 132, lower contact of off-normal transfer contacts 120, normally closed contacts MID–8, normally closed remote identification contacts RI–3, and wiper of level B to ground. At the home position, the stepping switch is prepared for normal operation for the next message.

The simplicity of the above-described message identification circuitry with automatic switching between a tape reader and another signal generator should be apparent when it is realized that the mechanical timing contacts on the tape reader and distributor not only synchronize the transmission of signals with the generation of the signals but also switch alternative signal generators at appropriate times.

Although only one embodiment of the invention is shown in the drawings and described in the foregoing specification it will be understood that invention is not limited to the specific embodiment described but is capable of modification and rearrangement and substitution of parts and elements without departing from the spirit of the invention.

What is claimed is:

1. In a transmitting apparatus for transmitting messages having preceding identifying signals, information signals, and succeeding end-of-message signals; a first signal generator for generating information signals; a switch operated in response to the presence of information in the first signal generator; a second signal generator for generating preceding identifying signals and succeeding end-of-message signals; a start message transmission contact; means responsive to the operation of the start message transmission contact and the operation of the information presence switch for initiating operation of the second signal generator; means controlled by the operation of the second signal generator and responsive to the output thereof for transmitting, in sequence, the identifying signals; means controlled by the second signal generator at the termination of transmission of the identifying signals for initiating operation of the first signal generator and for transferring control of the transmission means from the second signal generator to the first signal generator, the second signal generator suspending operation; timing contacts operated by the first signal generator and the transmission means; means for reinitiating operation of the second signal generator in response to the operation of the timing contacts and the release of the switch upon completion of the transmission of information from the first signal generator whereupon the control of the transmission means is transferred from the first signal generator to the second signal generator causing the end-of-message signals generated by the second signal generator to be transmitted by the transmission means.

2. In a transmitting apparatus for transmitting messages having succeeding end-of-message code combinations, means for generating message code combinations, a message presence switch in said message code combination generating means operated by the presence and released by the absence of a message code combination in said message generating means, a first cam operated timing contact cyclically operated by said message generation means during the generating of the message code combinations, a stepping switch having end-of-message code combinations encoded on predetermined positions thereof, means controlled by said message code combination generating means and said predetermined positions of said stepping switch for transmitting the message and end-of-message code combinations, respectively, a second cam operated timing contact cyclically operated by said transmitting means, and means controlled by release of said message presence switch and by operation of said first and second cam operated timing contacts for switching control of said transmitting means from said message code combination generating means to said predetermined positions of said stepping switch.

3. In a telegraph transmitting apparatus for transmitting information having preceding identifying signals, message signals and succeeding end-of-message signals, a two-shaft transmitter distributor including a tape reader having a shaft and a distributor having a shaft, timing contacts cyclically operated by said shafts, a tape controlled contact operated by the presence of tape in said reader, a stepping switch having encoded thereon identifying code combinations and end-of-message code combinations on predetermined positions and also having encoded thereon a message position for interconnecting said reader and said distributor, a magnet for operating said stepping switch, a first energizing circuit for said stepping switch magnet including said distributor timing contacts for stepping said switch through the identifying positions to said message position, means for supplying said identifying code combinations to said distributor for transmission, means operated by said stepping switch in said message position and said tape controlled contact for energizing said tape reader causing said reader to supply message signals from a tape in said reader to said distributor over said interconnection established by said stepping switch at said message position, and a second energizing circuit for said stepping switch including said tape controlled contact in said tape reader and said timing contacts operated by said reader and said distributor shafts to step the stepping switch from the message position to a succeeding position to initiate transmission of the end-of-message signals.

4. Central office equipment for torn-tape telegraph switching systems wherein messages comprised of station identifying signals, message text signals, and end-of-message signals are transmitted over a telegraph line under control of a tape having the message text perforated in it as received in the central office including (a) a stepping switch having the code combinations of signals representing the station identification and the end-of-message groups of signals encoded thereon in various positions for incorporation in the transmitted message, (b) a distributor for sequentially transmitting said signals, (c) a tape reader for reading the message text from the tape, (d) a tape presence detecting switch in the reader, said switch operated by the presence of tape and released in the absence of tape in said reader, (e) means for connecting the position of said stepping switch representing the station identification group of signals to the distributor, (f) a cam operated contact in the distributor, operated once in each cycle of operation of the distributor, (g) means responsive to the initial operation of said tape presence switch and including said cam operated contact for actuating said stepping switch, (h) means operated by said tape presence detecting switch when the stepping switch is in a predetermined position for connecting said tape reader to said distributor, and (i) means operated by the release of said tape presence detecting switch for disconnecting said distributor from said tape reader and for connecting said distributor to the end-of-message positions of the stepping switch.

5. In a transmitting apparatus for transmitting messages having identifying code combinations, message code combinations, and end-of-message code combinations, first means for generating the message code combinations; second means for generating the identifying and end-of-message code combinations; means for transmitting the code combinations generated by each of said generating means; means having a plurality of circuit controlling positions for selectively connecting said first generating means with said transmitting means and for selectively connecting said second generating means with said transmitting means; means in said first generating means operated by the presence of a message in said first generating means for initially causing the operation of said circuit controlling means and said second generating means; means cyclically operated by said transmitting means for stepping said circuit controlling means through positions corresponding to said identifying code combinations wherein said second generating means is connected to said transmitting means; means responsive to a predetermined position of said circuit control means following the identifying code positions and further responsive to the operation of said message presence means for connecting said first signal generating means to said transmitting means and for operating said first signal generating means, said circuit controlling means being temporarily prevented from operating and said second generating means being disconnected from said transmitting means; means operated by said first generating means at the end of a message generated thereby for reinitiating operation of said second generating means and said circuit controlling means and for reconnecting said second generating means to said transmitting means in response to the operation of said cyclically operated means and the release of said message presence means.

6. In a transmitting apparatus for a telegraph system for transmitting messages having message identifying signals, message signals and end-of-message signals, (a) a message signal generator having a message-out contact and start contacts, (b) a stepping switch having positions thereon encoded with the identifying and end-of-message signals and having a position thereon connected with said message signal generating means, (c) a distributor for transmitting the identifying, the message, and the end-of-message signals, said distributor being connected to the identifying, message and end-of-message positions on said stepping switch, (d) a distributor cam operated contact operated during each cyclic operation of said distributor, (e) a stepping switch control circuit including said distributor cam operated contact for stepping said stepping switch through the identifying and end-of-message positions, (f) a first contact operated by said message generating means, (g) means for sequentially connecting the message identifying positions of said stepping switch with said distributor and for then connecting said message signal generator with said distributor, said connecting means being operated by said message-out and start contacts and said stepping switch, (h) means responsive to operation of said first contact, said distributor cam operated contact, and said message out contact due to absence of a message in said message signal generator for causing said stepping switch to be stepped from the message position to an end-of-message position and for causing said connecting means to connect the end-of-message positions of said stepping switch with said distributor.

7. In the transmitting apparatus according to claim 6, a message identification deletion switch, said message identification deletion switch having first and second contacts, said first contact of said message identification deletion switch disabling said distributor means to prevent the transmission of said identifying signals when said deletion switch is operated, and a stepping switch control circuit including said second contact of the message identification deletion switch for stepping said stepping switch through said identifying positions on said stepping switch to the message position on said stepping switch when said deletion switch is operated.

8. In the transmitting apparatus according to claim 6, a line seizure switch having first and second contacts, said first contact of said line seizure switch disabling said message signal generator when said line seizure switch is operated, a reset switch having a contact, and a control circuit for said stepping switch including said reset switch contact for moving said stepping switch from the message position to the end-of-message position when said reset switch is operated, said second contact preventing further operation of said stepping switch until said line seizure switch is released.

9. In a transmitting apparatus for transmitting messages from each one of a plurality of message sources and for providing the messages with identifying and end-of-message signals from other sources, a plurality of message signal generators each having a message in switch and a start switch, operation of the message in switch indicating the presence of a message in its associated message signal generator and release of the message in switch indicating the absence of a message in its associated message signal generator; an identifying and end-of-message signal generator; a stepping switch having positions thereon associated with identifying signals, message signals, and end-of-message signals, the stepping switch being connected with the identifying and end-of-message signal generator when it is in the identifying and end-of-message positions and being connected with a selected one of the message signal generators when it is in the message position; at least one distributor for serializing and transmitting signals applied thereto, each distributor cyclically operating a timing contact during its operation, one of the distributors connected to the identifying message and end-of-message positions on the stepping switch to receive the signals applied through these positions for serializing and transmitting these signals; a plurality of control relays, each of the control relays being associated with a particular message signal generator and being operated in response to the operation of the message in switch associated with that signal generator; a cam operated timing contact in each of the message signal generators cyclically operated during operation of its associated message signal generator; a plurality of control circuits for initiating the generation of messages by the message signal generators, each of the control circuits including the stepping switch in the message position, contacts operated by the control relay associated with a particular message signal generator and the start switch associated with that same particular signal generator; means for causing the distributor to be controlled over a circuit including the message position of the stepping switch by the cam operated timing contact associated with a message signal generator in the process of generating a message; and a plurality of circuits for stepping the stepping switch from the message position to an end-of-message position, each of the stepping circuits being operated upon release of the message in switch and including the cam operated timing contacts of the message signal generators and a distributor timing contact.

References Cited by the Examiner

UNITED STATES PATENTS

| | | | |
|---|---|---|---|
| 2,116,506 | 5/38 | Carr et al. | 178—3 |
| 2,116,549 | 5/38 | Zenner | 178—3 |
| 2,296,845 | 9/42 | Goetz | 178—3 |
| 2,331,914 | 10/43 | Janiszewski | 178—3 |

ROBERT H. ROSE, *Primary Examiner.*

UNITED STATES PATENT OFFICE
CERTIFICATE OF CORRECTION

Patent No. 3,179,742 April 20, 1965

Gordon C. Meyers

It is hereby certified that error appears in the above numbered patent requiring correction and that the said Letters Patent should read as corrected below.

Column 2, lines 63 and 64, after "wherein" insert a colon; column 4, line 57, for "NCR-3" read -- UCR-3 --; column 11, lines 19 and 20, for "potentiial" read -- potential --; line 23, for "starts" read -- start --; line 47, for "transcers" read -- transfer --; column 12, line 11, after "part," insert -- to --; column 19, lines 18 and 19, strike out "lower contact of off-normal transfer contacts 132,"; column 20, line 53, for "circiut" read -- circuit --; column 21, line 12, for "enerigzing" read -- energizing --; column 22, line 14, strike out "code combination"; line 15, after "message" insert -- code combination --; lines 16 and 17, for "generation" read -- generating --; line 17, for "generating" read -- generation --.

Signed and sealed this 29th day of March 1966.

(SEAL)
Attest:

ERNEST W. SWIDER
Attesting Officer

EDWARD J. BRENNER
Commissioner of Patents